(12) United States Patent
Agashkov et al.

(10) Patent No.: US 9,778,019 B2
(45) Date of Patent: Oct. 3, 2017

(54) DIFFERENTIAL POLARIZATION INTERFEROMETER

(71) Applicants: King Abdul Aziz City for Science and Technology, Riyadh (SA); B.I. Stepanov Institute of Physics of the National Academy of Sciences of Belarus, Minsk (BY); Institute of Chemistry of New Materials of National Academy of Sciences of Belarus, Minsk (BY)

(72) Inventors: Alexander Vasilevich Agashkov, Minsk (BY); Nikolai Stanislavovich Kazak, Minsk (BY); Vladimir Enokovich Agabekov, Minsk (BY); Marzook Saleh O Alshammari, Riyadh (SA); Mohammed A Binhussain, Riyadh (SA)

(73) Assignee: King Abdulaziz City for Science and Technology-KACST, Riyadh (SA)

( * ) Notice: Subject to any disclaimer, the term of this patent is extended or adjusted under 35 U.S.C. 154(b) by 137 days.

(21) Appl. No.: 14/929,374

(22) Filed: Nov. 1, 2015

(65) Prior Publication Data

US 2016/0231099 A1 Aug. 11, 2016

(51) Int. Cl.
*G01B 9/02* (2006.01)
*G01J 9/02* (2006.01)
(52) U.S. Cl.
CPC ........ *G01B 9/02011* (2013.01); *G01B 9/0201* (2013.01); *G01J 9/02* (2013.01)

(58) Field of Classification Search
CPC .............. G01B 9/0201; G01B 9/02011; G01B 9/02017; G01B 9/02018; G01B 2290/70;
(Continued)

(56) References Cited

U.S. PATENT DOCUMENTS 5,420,717 A * 5/1995 Tabata ................. G02B 5/3083
359/371
6,078,393 A * 6/2000 Oohashi .................... G03F 1/26
356/511

(Continued)

OTHER PUBLICATIONS

Kildishev, Alexander V., et al. "Negative refractive index in optics of metal-dielectric composites." JOSA B 23.3 (2006): 423-433.*

*Primary Examiner* — Shawn Decenzo
(74) *Attorney, Agent, or Firm* — Timberline Patent Law Group PLLC (57) ABSTRACT

A differential polarization interferometer is provided. An interferometer performs direct measurement of phase shift of a light wave passed under an arbitrary angle through a sample composed of a transparent substrate holding a thin deposited test film, for metamaterial testing. An example apparatus has a laser source and a first polarizer, and two optically connected arms. A first arm creates orthogonally polarized components of a single output beam for a broadband non-polarizing beam splitter. A second arm has a controllable phase retarder to introduce a phase shift into one polarization component of the reflected single output beam, and a second polarizer to equalize and mix the polarization components of the reflected single output beam. This transforms the reflected single output beam into a beam resulting from interference of polarization components of the reflected single output beam. A photodetector transforms an intensity of the beam into an electric signal for output.

2 Claims, 4 Drawing Sheets

(58) Field of Classification Search
CPC ............ G01J 9/0215; G01J 2009/0223; G01J 2009/0261; G01J 2009/0265
See application file for complete search history.

(56) References Cited

U.S. PATENT DOCUMENTS 8,416,400 B2 * 4/2013 Cui .................. G01J 9/0215
356/121
9,297,980 B2 * 3/2016 Kimura ................ G01N 21/65

* cited by examiner

DIFFERENTIAL POLARIZATION INTERFEROMETER

BACKGROUND OF THE INVENTION

1. Field of the invention

The present invention relates to the field of differential polarization interferometry and can be used for the direct measurement of phase shift of a light wave passed under arbitrary angle through the sample consisting of a transparent substrate and deposited on it thin film under test that is rather important at metamaterial testing.

2. Description of the Related Art

The known system of measuring the phase shift in the material, based on the reflective Mach-Zehnder interferometer with two parabolic mirrors in which the incident light is split using non-polarizing beam splitter cube into two beams, object and reference ones. Then these two beams are overlapped using plane mirrors for interference onto the input slit of the spectrometer [1]. The sample was made of a substrate, on the part of which a film under test has been deposited, and it can be shifted in a transverse direction. The interferogram of the sample area containing only a substrate and the interferogram of the substrate with thin film under test are processed with the technique known as spectrally and spatially resolved interferometry (SSRI). The disadvantages of this system are the problems of measuring the phase shift of the sample when it is tilted, as disrupted Mach-Zehnder interferometer due to shear the object beam, as well as lack of sensitivity due to single passing of object beam through a film.

One type of interferometer representative of the state-of-the-art is the differential plane mirror interferometer described in [2]. It comprises a laser source emitting a beam with two orthogonal polarization components, birefringent optical element converting the input beam into two separated, parallel, orthogonally polarized beams. The birefringent element together with two quarter-wave plates, one of which contains two holes, retro-reflector with a pair of holes and two plane mirrors, the first of which contains two holes, causes each of the separated, parallel, orthogonally polarized beams to be reflected twice by one of the two mirrors. The birefringent element converts the two separated, parallel, orthogonally polarized output beams into a single output beam wherein the phase shift between the two polarization components is directly proportional to the optical path between the two plane mirrors. Polarizer mixes the orthogonal components of the single output beam. A photoelectric detector produces an electrical measurement signal. An electronic device is used for signal analysis and extracting the phase shift. This interferometer possesses a number of disadvantages, namely, a complicated optical scheme, requiring adjustment of a many optical components, which contribute to the output beam of reflection from faces limiting the accuracy; operation in a narrow spectral band defined by quarter-wave plates; necessity to measure the thickness of the sample substrate.

An interferometer (walk-off interferometer) [3] is the closest to the technical nature of the proposed technical solution (prototype device). The device comprises the tunable laser source, the first polarizer with a transmission axis at 45° to produce a beam having two orthogonally polarized components; the first birefringent element, which converts these components into two separate, plane, orthogonally polarized beams, one of which is an object one, the other is a reference one; the sample made as a plane-parallel transparent substrate, wherein a part of the surface is deposited with a thin film of the test material, and which can be moved laterally so that object beam passed through the film; half-wave plate swapping polarization of the beams; the second birefringent element that converts orthogonally polarized beams into a single output beam with two orthogonally polarized components; controllable liquid crystal (LC) phase retarder; the second polarizer, parallel to the first one, at the output of which two polarization components interfere; photodetector transforming the result of interference into electric signal, which can be analyzed by various electronic devices.

This interferometer possesses a number of disadvantages: differences in properties of birefringent elements can lead to the non-compensated phase shift between reference and object beams that lowers the accuracy of measurements; initial voltage on the LC phase retarder can get into the area, where large phase shift corresponds to the small one of the controlling voltage that makes worse the accuracy of measurements; operation in a narrow spectral region through the half-wave plate; inefficient sensitivity determined by a single passing of a film by light; rotation of a sample creates problems due to the shift of the two beams, incident on the second birefringent element.

SUMMARY OF THE INVENTION

The present invention provides an interferometer advantageous in increasing the sensitivity of direct measurement of phase shift at various angles of sample inclination, comprising: tunable laser source of an input beam with two linear orthogonally polarized components; the first polarizer for linearly polarizing said light beam; broadband non-polarizing beam splitter forming two optically connected arms of interferometer; in the first arm formed with a transmitted beam there are sequentially arranged: the birefringent element; for converting said input beam into two separated, parallel, orthogonally polarized reference beam and object beam; the base with fine rotation of the birefringent element; the sample consisting of a transparent substrate, on the part of the surface of which the film under test is deposited; the base with adjustable shift and rotation of the sample; the chopper wheel with the system of holes that opens sequentially for some time object and reference beams separately, then simultaneously, providing interference of said beams; broadband plane mirror reflecting incident beams into opposite direction and providing the second passing of the said beams through the sample and the birefringent element that converts the two separated, parallel, orthogonally polarized beams into a single output beam in which the phase shift between the two polarization components of the single output beam is directly proportional to the optical path delay produced by a film under test; in the second arm of the interferometer formed with a reflected said beam there are sequentially arranged: the controllable phase retarder which change the relative phase of the two orthogonal components of reflected beam; the second polarizer for mixing the orthogonal components of the said beam and allowing them to interfere; and the photodetector for producing an electrical measurement signal which can be amplified and analyzed by various electronic devices.

According to the present invention, limitation on tuning of incident radiation frequency specified with phase plate is eliminated; interferometer sensitivity is increased by two times; accuracy of measurements is increased due to optimal initial phase shift of the retarder; correct measurement of the phase shift produced by thin absorbing/reflecting films is provided; measurement of the phase shift at various angles of inclination of the sample is provided without re-adjustment of the interferometer's elements.

These features and advantages of the invention will be apparent from the detailed description of invention, as illustrated in the accompanying drawings.

BRIEF DESCRIPTION OF THE DRAWINGS

In order to illustrate the principle of the invention the following drawings are included in the disclosure.

REFERENCE SIGNS LIST

1 Tunable laser source of coherent radiation
2 Polarization rotation unit (first polarizer)
3 Broadband non-polarizing beam splitter
4 Birefringent element
5 Base with fine rotation of birefringent element
6 Sample
7 Substrate
8 Film under test
9 Base with adjustable shift and rotation of the sample
10 Chopper wheel with system of holes
11 Plane broadband mirror
12 Controllable phase retarder
13 Second polarizer
14 Photodetector
15 Beam
16 Beam
17 Face
18 o-polarized beam
19 e-polarized beam
20 Face
21 Beam
22 Beam
23 Beam
24 Beam
25 Beam
26 Beam
27 Output electric signal
28 Optical axis of birefringent element 4
29 Normal to face of birefringent element 4
30 Pulse of the signal from one of polarization components of the beam incident on the photodetector
31 Pulse of the signal from the second polarization component of the beam incident on the photodetector
32 Pulse of the signal from the interference of polarization components of the beam incident on the photodetector
I first arm
II Second arm

DETAILED DESCRIPTION

Figure 1:
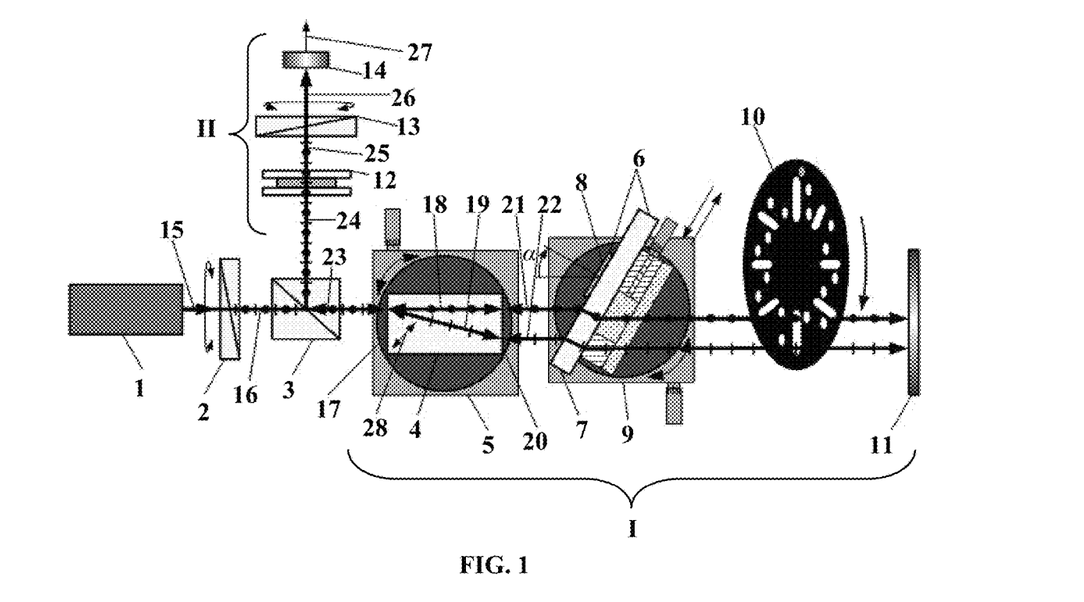
FIG. 1 depicts in schematic form an embodiment of the instant invention.

The differential polarization interferometer (further, interferometer) is schematically illustrated in FIG. 1. The interferometer without polarization losses operates as follows. Tunable laser source of coherent radiation 1 (further, source 1) generates an output beam 15, that propagates through polarization rotation unit 2 (further, first polarizer 2). The source 1 may generate the output beam 15 as a polarized beam or as an unpolarized beam. A polarizer 2 is placed between the light source 1 and broadband non-polarizing beam splitter 3 (50%:50%), to polarize the light beam 15, if it is generated unpolarized, or to clean up the polarization of the light beam if it is generated as a polarized beam. Polarizer 2 with the transmission axis of 45° forms in beam 16 two orthogonally polarized components having the same intensities. Said beam propagates through broadband non-polarizing beam splitter 3 (further, beam splitter 3) that forms two optically connected arms I and II. In arm I, transmitted said beam 16 passes through a birefringent element 4 (further, element 4) mounted on a base with fine rotation 5, allowing one to control rotation of element 4. Said beam passes through face 17 of element 4. At the presence of antireflection coatings on faces 17 and 20, the element 4 can be aligned along beam 16 and its faces will be perpendicular to incident beams. Element 4 without antireflection coatings of faces should be inclined at the angle, enough for preventing interference of beams reflected from faces, for example, at ~20 arcminutes. The element 4 converts the polarization components of the beam 16 into two orthogonally polarized beams, o-polarized beam 18 and e-polarized beam 19. As a result, after passing through face 20 of element 4, said element 4 forms two separate, parallel, orthogonally polarized beams 21 and 22. Further said beams 21 and 22 pass through the sample 6 consisting of transparent substrate 7, wherein a part of the surface is deposited with a film under test 8 (further, film 8) and which is mounted on a base with adjustable shift and rotation 9. Then said beams 21 and 22 pass through a chopper wheel with system of holes 10 (further chopper 10) The chopper 10 is constructed in such a way that, when rotating, it opens periodically at first one beam, for example, beam 21, then the second beam 22, and then both beams simultaneously. Said beams 21 and 22 fall on a broadband plane mirror 11. Said mirror 11 reflects incident beams in the opposite direction and provides reverse passing of the said beams 21 and 22 through the sample 6 and face 20 of element 4. The said beams propagate in opposite directions through element 4 coinciding with directions of o-polarized beam 18 and e-polarized beam 19, respectively. After passing the face 17, element 4 converts two said beams into orthogonally polarized components of a single output beam 23. Beam splitter 3 reflects a part (~50%) of the said beam 23 into arm II as a beam 24. Reflected beam 24 passes through controllable phase retarder 12 (further, retarder 12). Polarization components of said beam 24 after passing through retarder 12 obtain additional phase retardation ϕ(V) and form beam 25, where V is controlling voltage applied to retarder 12. The retarder 12 is set in such a way that it introduces phase shift only into one polarization component of beam 25, which coincides with the polarization of one of beams 21 or 22. The second polarizer 13 with the transmission axis at ±45° mixes the polarization components of the input beam 25 and transforms said beam 25 into beam 26, which is the result of interference of polarization components. Said beam 26 falls on a photodetector 14. Said photodetector 14 transforms intensity of said beam 26 into output electric signal 27, which can be amplified and analyzed by various electrical devices, for example, digital oscilloscope, the last connected to computer.

Figure 2:
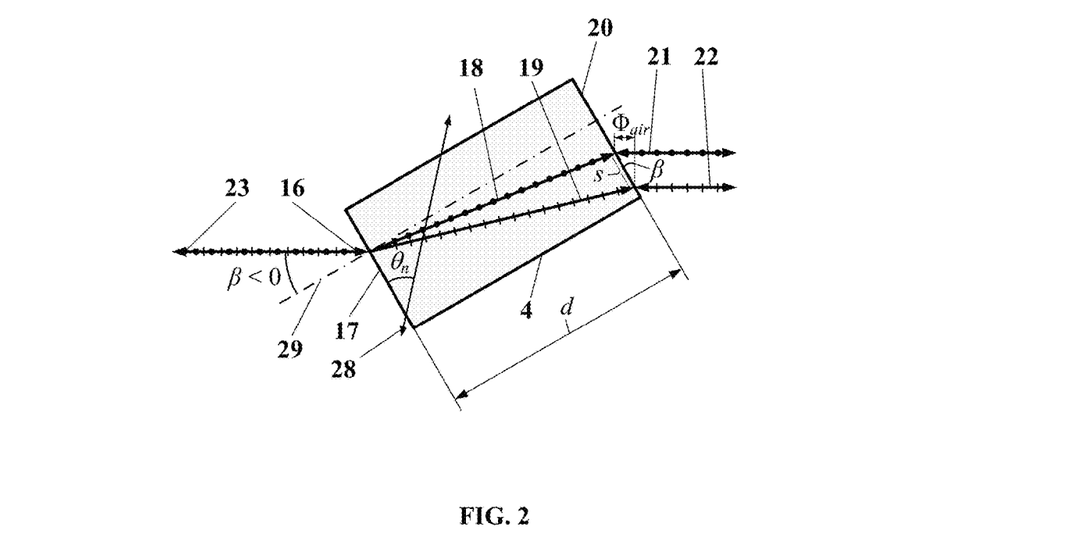
FIG. 2 shows a diagram for the calculation of the phase shift between beams owing to rotation of a birefringent element in a main plain counterclockwise.
Figure 3:
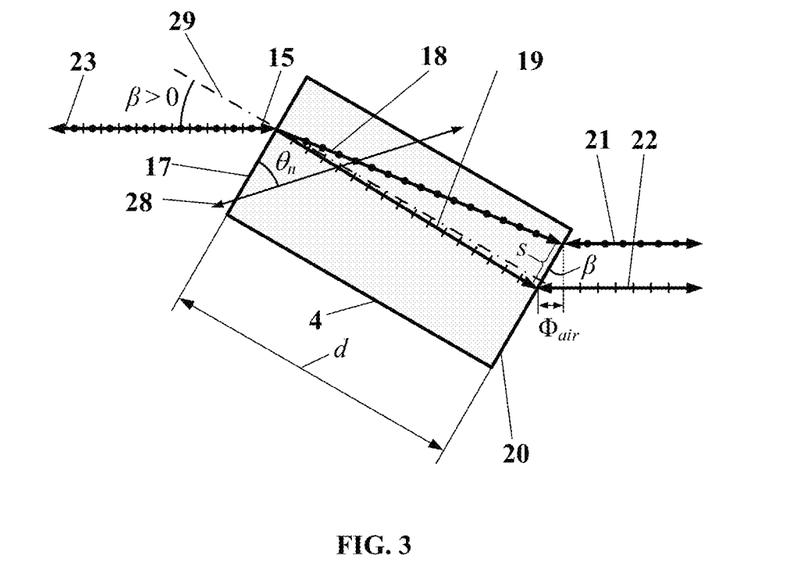
FIG. 3 shows a diagram for the calculation of the phase shift between beams owing to rotation of birefringent element in a main plain clockwise.

Consider in details the features of the interferometer operation without losses of orthogonally polarized beams. At the first stage of measurement both beams, 21 and 22, pass only through substrate 7 that is why it is necessary to compensate the phase shift of polarization components of the beam 25. FIG. 2 and FIG. 3 explain principle of the phase shift compensation between polarization components of beam 25, realized in the present interferometer owing to fine rotation of the element 4. Element 4 is a plane-parallel plate, with a cut under the angle $\theta_n$ to the optical axis 28 of a birefringent crystal. For simplicity of calculations let beam 16 consisting of two orthogonally polarized components propagates in a main plane of the element 4 under the angle of β to normal to face 29 of the element 4. There it is splitted into two beams—o-polarized 18 and e-polarized 19, propagating in different directions. At the output face 20 of the element 4, these beams possess the phase shift $\Phi_{bd}$ [4]:

$$\Phi_{bd}(\beta) = (k_{ez} - k_{oz})d,$$

where $$k_{ez} = \frac{2\pi}{\lambda}\left[\frac{n_o n_e}{\varepsilon_{zz}}\sqrt{\varepsilon_{zz} - \sin^2\beta} - \frac{\varepsilon_{xz}}{\varepsilon_{zz}}\sin\beta\right],$$

$$k_{oz} = \frac{2\pi}{\lambda}\left[\sqrt{n_o^2 - \sin^2\beta}\right],$$

$$\varepsilon_{zz} = n_o^2 + (n_e^2 - n_o^2)\sin^2\theta_n, \varepsilon_{xz} = \varepsilon_{zx} = (n_e^2 - n_o^2)\sin\theta_n\cos\theta_n,$$

where d is the element 4 length; λ is the wavelength of laser source 1 (in vacuum); $n_o$ and $n_e$ are ordinary and extraordinary refraction indexes, respectively.

Beams 20 and 21 being the extensions of o-polarized beam 18 and e-polarized beam 19, respectively, propagate from the element 4 under the angle β to its normal to face 29. They are parallel and obtain additional phase shift $\Phi_{air}(\beta)$=s·sin β, where s is a distance between the o-polarized beam 18 and e-polarized beam 19 at the face 20 of the element 4. The phase shift is equal to $\Phi(\beta)=\Phi_{bd}(\beta)+\Phi_{air}(\beta)$. At β<1° in the first approximation distance s can be considered as a constant.

After passing of beams 21 and 22 through the substrate 7, the phase shift does not change. The phase shift between orthogonally polarized components of beam 24 after double passing through the element 4 is equal to $2\Phi_f(\beta)$. The resulting phase shift between orthogonally polarized components of beam 25 after passing retarder 12 is equal to $\Phi_{II}(\beta)=\phi_1+2\Phi_f(\beta)$, where $\phi_1$ is the phase shift provided by retarder at applied voltage $V_1$. Rotation of the element 4 at angle β leads to position where the phase shift between them becomes equal to $\Phi_{II}(\beta)=2\pi(N+m/2)$, where N and m are the integers. Under the circumstances, beam 26, incident on the photodetector 14 is suppressed at odd m=1, 3, 5, . . . , when the transmission axis of the polarizer 13 is at an angle of 45°, and at even m=0, 2, 4, . . . , when the transmission axis of polarizer 13 is at an angle of −45°.

Figure 4:
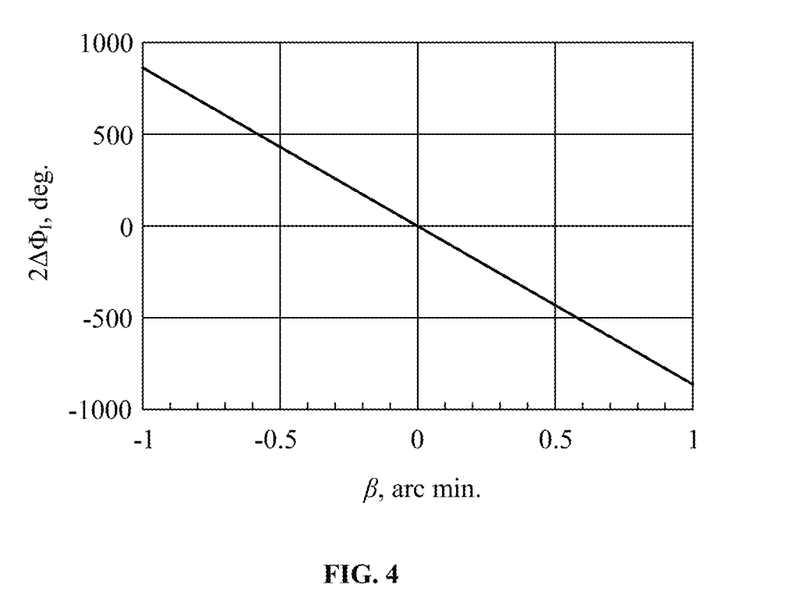
FIG. 4 shows the change of phase shift of beam polarization components at the input to the controllable phase retarder owing to rotation of birefringent element in main plane within the region of −1 . . . +1 arcmin.
Figure 5:
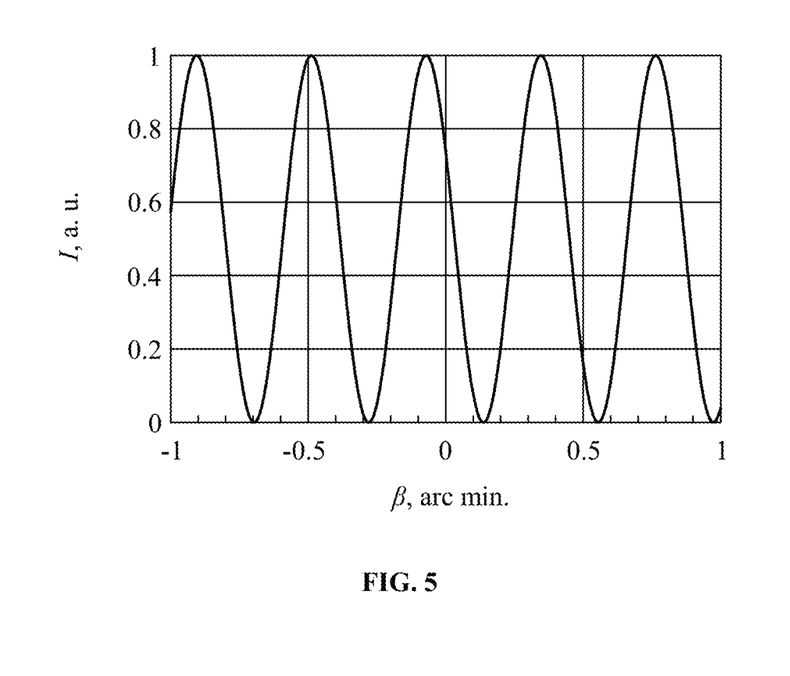
FIG. 5 shows the change of beam intensity incident on the photodetector owing to rotation of birefringent element in the main plane within the region of −1 . . . +1 arcmin.

The element 4 can be made of different crystals with high birefringence, such as calcite ($CaCO_3$), yttrium vanadate ($YVO_4$), alpha barium borate (α-BBO) and others. The example of the calculated dependences $2\Delta\Phi_f(\beta)=2\cdot[\Phi_f(\beta)-\Phi_f((\beta_{max}-\beta_{min})/2)]$ and $I(\beta)=0.5\cdot\{1-\cos[2\Phi_f(\beta)]\}$ for the element 4 made of calcite are given in FIG. 4 and FIG. 5, where $\beta_{min}=-1'$ and $\beta_{max}=1'$ are the minimal and maximal angle on the axis of abscissas, respectively. In the calculation for λ=0.6328 μm there have been used the following parameters of the birefringent element: $n_o$=1.65569, $n_e$=1.48491; $n_e-n_o$=−0.17078 ($n_e-n_o$≈−0.17 for a visible region); d=27 mm, s=3 mm. The rotation of the element 4 in the main plane between two positions, when the beam 26 is blocked, is ~25 arc seconds within the region−21+21 arc minutes. This situation does not qualitatively change with rotation of the element 4 in arbitrary plane, but the theoretical calculation becomes lengthy. Hereby, adjustment of the said element 4 demands the second of arc accuracy.

At the second stage of measurement sample 6 is displaced in such a way that one of the beams, 21 or 22, passes through the film 8. In this case, it is called as an object beam and the second one as a reference beam. The additional phase shift Δϕ between the beams arises. After reflection of beams from plane broadband mirror 11, as a result, of double passing of the object beam through the film 8, the phase shift of the beams 21 and 22 at the face 20 of the element 4 is amounted to 2Δϕ. For direct measurement of the phase shift 2Δϕ the phase retardation $\phi_2$ is adjusted on retarder 12, resulting in suppression of the beam 26 with polarizer 13. If retarder 12 controls the phase shift of the component of beam 25, the polarization of which coincides with the polarization of object beam, then $(\phi_2-\phi_1)$=−2Δϕ, and $$\Delta\phi=[(\phi_1-\phi_2)]/2, \qquad (1)$$

respectively. With the phase shift of the component of the beam 25, the polarization of which coincides with the polarization of reference beam, then $$\Delta\phi=-[(\phi_1-\phi_2)]/2. \qquad (2)$$

Thus, due to proposed solution, the increase of sensitivity of the present interferometer is increased by 2 times compared to the prototype.

Figure 6:
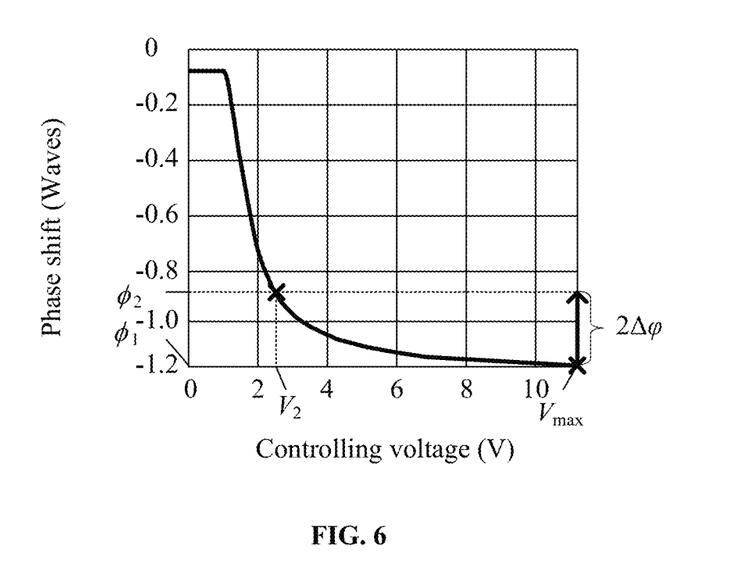
FIG. 6 shows the advantage of the proposed invention for controllable LC phase retarder with typical curve of phase shift vs the controlling voltage.

FIG. 6 shows typical volt-phase characteristic of controllable phase retarder with LC uniaxial positive crystal. At the first stage of measurement, any initial voltage within working range can be applied to retarder, thereby the region on the calibration curve providing high accuracy of measurement is selected.

Figure 7:
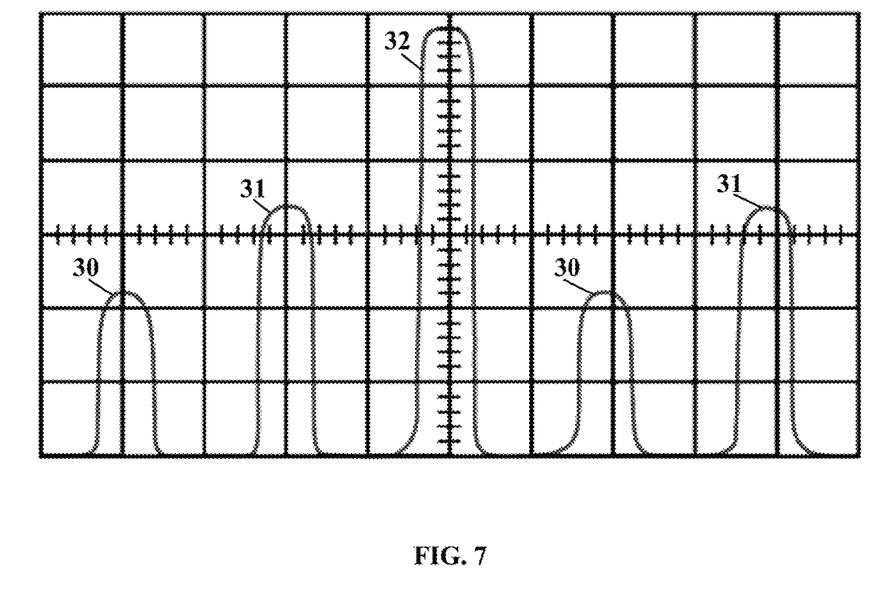
FIG. 7 shows the change in time of the signal of a beam incident on the photodetector with acting chopper wheel; intensities of polarization components are different, the phase shift is not compensated; the vertical axis of a diagram is the amplitude of signal in arbitrary units, horizontal axis is time in milliseconds per division.
Figure 8:
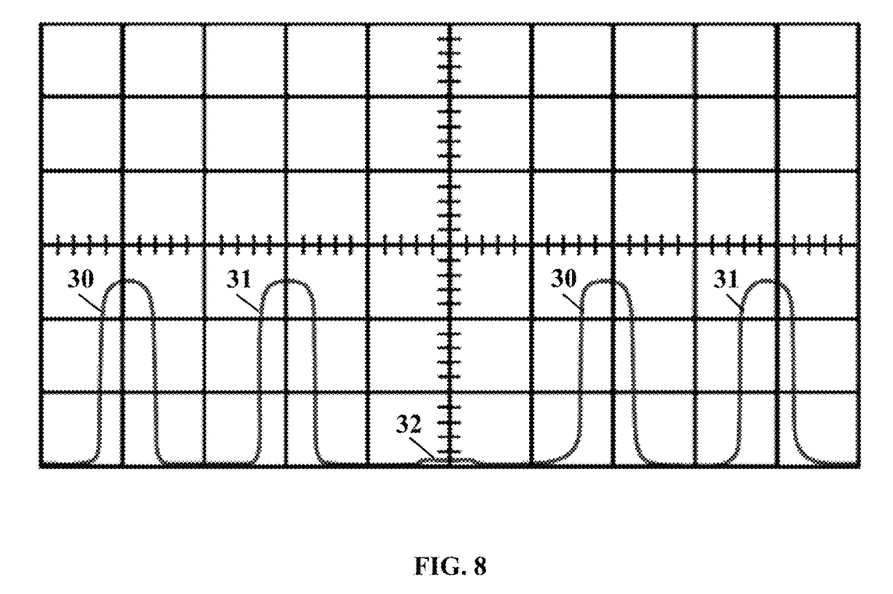
FIG. 8 shows the change in time of the signal of a beam incident on the photodetector with acting chopper wheel; intensities of polarization components are equal, the phase shift is compensated; the vertical axis of a diagram is the amplitude of signal in arbitrary units, horizontal axis is time in milliseconds per division.

In practice, the orthogonally polarized beams 21 and 22 passing through the object suffer losses. The difference in losses at double passing of the substrate at inclination of the sample can reach 12% and in the result of passing of a beam through the absorbing or/and reflecting film its intensity can decrees in 10-100 times. For correct measuring of phase shift, it is necessary to equalize the intensities of polarization components of the beam 26, incident on the photodetector 14. With this aim the chopper wheel 10 is used, which can be made in a form of rotating disk with the system of holes. To obtain stable measurements with connected electronic device, the trigger circuit may be used. The chopper wheel 10 opens sequentially for some time beams 21 and 22 separately, then simultaneously. As a result, one obtains pulses 30 of one polarization component, pulses 31 of the second polarization component and pulses 32 of the interference of polarization components (further, signal pulses 30, signal pulses 31, signal pulses 32) corresponding to beam 26 incident on the photodetector 14 as is shown in FIG. 7 and FIG. 8. The signal pulses 30 and 31 can differ in magnitude, and the magnitude of signal pulse 32 differ essentially from zero value. At the initial stage of measurement, when both beams 21 and 22 pass through the substrate, amplitudes of signal pulses 30 and 31 are equalized by rotation of first polarizer 2. When both beams 21 and 22 are open, the orthogonally polarized components interfere after passing second polarizer 13, and at the output of the photodetector 14 the signal pulse 32 is obtained. One achieves the minimal magnitude of signal pulse 32 by rotation of element 4. The operations of equalizing magnitudes of signal pulses 30 and 31 and minimization of the magnitude of signal pulse 32 can be produced consequently several times to obtain the necessary result. After rotation of element 4, the final set-up of the minimal initial phase shift is achieved by the fine tuning of the voltage applied to retarder 12, to which corresponds the retarder phase shift $\phi_1$. At passing of one of the beams through the absorbing/reflecting film equalization of the magnitudes of signal pulses 30 and 31 are obtained by rotating the second polarizer 13. The minimization of the magnitude of signal 32 is achieved by adjustment of voltage applied to retarder 12 to which corresponds the retarder phase shift $\phi_2$. The operations of equalizing magnitudes of signal pulses 30 and 31 and minimization of the magnitude of signal 32 can be fulfilled sequentially several times to receive the necessary result. The procedure of measurement of phase shift $\Delta\phi$ using the retarder 12 is described above in details.

REFERENCES

1. O'Brien K., Lanzilotti-Kimura N. D., Suchowski H., Kante B., Park Y., Yin X., Zhang X. Reflective interferometry for optical metamaterial phase measurements//Opt. Lett.—2012.—Vol. 37, No. 19.—P. 4089-4091.
2. U.S. Pat. No. 3,950,078, G01B9/02, Aug. 21, 1990.
3. Kildishev A. V., Cai W., Chettiar U. K., Yuan H.-K., Sarychev A. K., Drachev V. P., Shalaev V. M. Negative refractive index in optics of metal-dielectric composites//JOSA.—2006.—Vol. 23, No. 3.—P. 423-433.
4. Ge Z., Wu. S.-T. Transflective liquid crystal displays.—Chichester, UK: John Wiley & Sons.—2010.—230 p.

What is claimed is:

1. A differential polarization interferometer, comprising:
a tunable laser source of coherent radiation generating an input beam;
a first polarizer which allows to convert the input beam into a polarized beam with adjustable intensities of orthogonally polarized components;
a broadband non-polarizing beam splitter forming two optically connected arms, a first one with a transmitted polarized beam;
in a first branch formed with the transmitted polarized beam there are sequentially arranged:
a birefringent element configured to split the transmitted polarized beam into two separate, parallel, orthogonally polarized, a reference beam and an object beam, and mounted on a base with fine rotation; and
a sample consisting of a transparent substrate, on the part of which a film under test is deposited, and mounted on the base with adjustable shift and rotation; and
a chopper wheel with a system of holes that opens sequentially for some time the object beam and the reference beam separately, then simultaneously, providing interference of the object beam and the reference beam; and
a broadband plane mirror reflecting an incident reference beam and an incident object beam in the opposite direction and providing double passing of the reference beam and the object beam through the sample and the birefringent element which converts the reference beam and the object beam into orthogonally polarized components of a single output beam falling on the broadband non-polarizing beam splitter;
in a second arm of the interferometer formed with a reflected single output beam there are sequentially arranged:
a controllable phase retarder configured to introduce phase shift only into one polarization component of the reflected single output beam; and
a second polarizer that equalizes and mixes the polarization components of the reflected single output beam and transforms the reflected single output beam into a beam which is the result of interference of polarization components of the reflected single output beam; and
a photodetector configured to receive the beam as input and transform an intensity of the beam into an output electric signal which can be amplified and analyzed by various electronic devices.

2. An apparatus, comprising:
a tunable laser source for providing an input beam to an interferometer;
a first polarizer;
a broadband non-polarizing beam splitter forming two optically connected arms;
a first branch formed comprising a birefringent element mounted on a base with fine rotation, a transparent substrate for holding a test film, a chopper wheel with a system of holes that opens sequentially for an object beam and a reference beam separately, then simultaneously, providing interference of the object beam and the reference beam, a broadband plane mirror reflecting an incident reference beam and an incident object beam in an opposite direction and providing double passing of the reference beam and the object beam through the sample and the birefringent element to convert the reference beam and the object beam into orthogonally polarized components of a single output beam to impinge on the broadband non-polarizing beam splitter;
a second arm of the interferometer comprising:
a controllable phase retarder to introduce a phase shift into one polarization component of the reflected single output beam, and a second polarizer to equalize and mix the polarization components of the reflected single output beam and transform the reflected single output beam into a beam resulting from interference of polarization components of the reflected single output beam; and a photodetector to transform an intensity of the beam into an output electric signal.

* * * * *